Dec. 22, 1931.     A. H. ZOLLER     1,837,513

GASOLINE PUMP

Filed Oct. 23, 1930     2 Sheets-Sheet 1

Dec. 22, 1931.  A. H. ZOLLER  1,837,513
GASOLINE PUMP
Filed Oct. 23, 1930   2 Sheets-Sheet 2
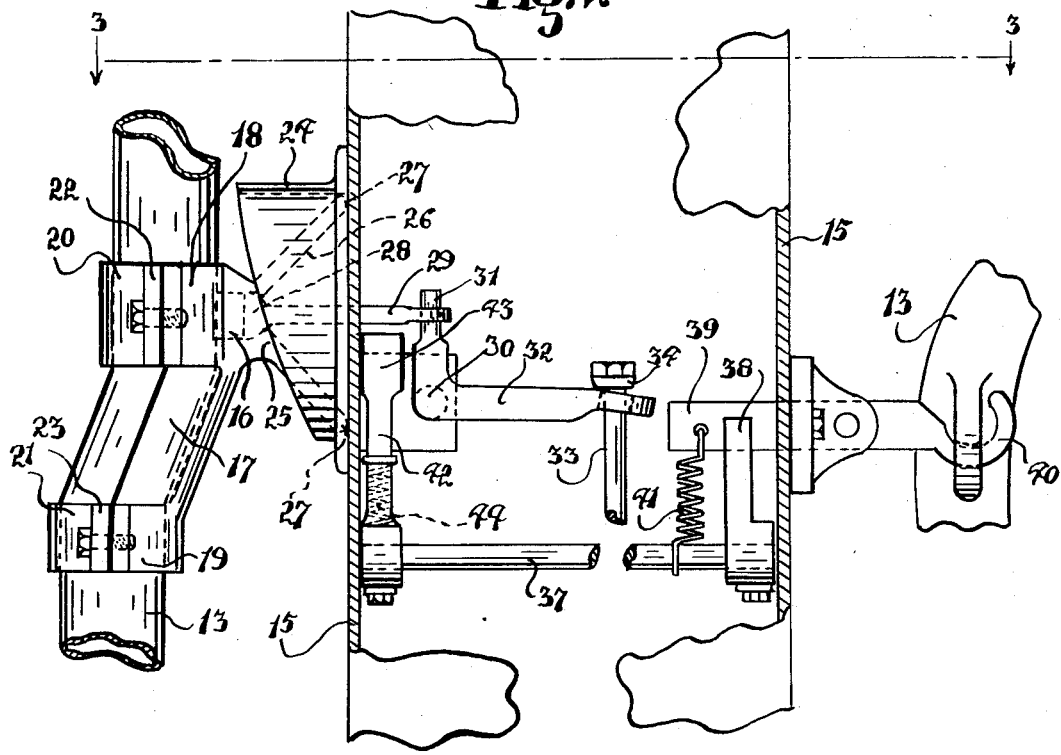
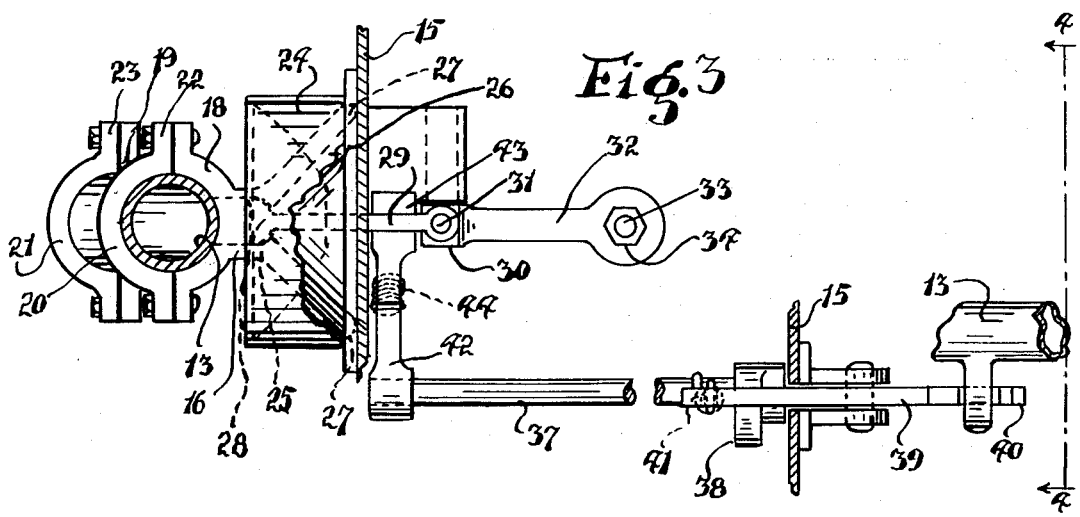
Alfred H. Zoller
INVENTOR
BY Frank T. Wentworth
ATTORNEY Patented Dec. 22, 1931

1,837,513

UNITED STATES PATENT OFFICE

ALFRED H. ZOLLER, OF DENVILLE, NEW JERSEY

GASOLINE PUMP

Application filed October 23, 1930. Serial No. 490,560.

My invention relates to gasoline pumps, and more particularly to a control mechanism by which the switch mechanism controlling the circuit to an electric motor is automatically actuated by the hose or tubing through which the gasoline is delivered, as a result of stresses applied to said hose or tubing.

In certain types of gasoline pumps an electric motor operates the pump to withdraw gasoline from the storage tank and deliver it through a hose or tubing to the tank of an automobile. The nozzle of the pipe or tubing is controlled by a manually operative valve mechanism, and the construction of the pump is such as to re-deliver gas withdrawn from the storage tank thereto, through an automatically actuated, valve controlled by-pass mechanism, when the nozzle valve is closed by the service man. The by-pass valve is actuated only when considerable pressure has been developed by the pump, as a result of the operation of the motor after the flow of gasoline through the pipe or tubing has been stopped by the closing of the valve controlling said nozzle. This over-running of the motor is undesirable, and may prove injurious to the motor if excessive pressures are allowed to develop.

Furthermore, the opening and closing of the circuit to the motor involves additional work by, and careful attention of, the service man, and there is always likelihood of such work being temporarily neglected, particularly as payment for the gasoline has to be collected, change made, and other services rendered, following the delivery of gas to the automobile tank.

With the above conditions in mind, I have provided a motor control mechanism which will automatically close the switch mechanism controlling the circuit to the motor as a result of the movement of the hose or tubing itself, when the service man applies the nozzle to an automobile tank, and will automatically close said switch mechanism when the service man releases the hose or tubing or restores the nozzle to the hook provided in all gasoline pumps. In fact, the service man is required to develop stresses upon the pipe or tubing to actuate the control of my invention in order to set the pump in motion, and to maintain such stresses to cause continued operation of the pump. Immediately that such stresses are materially relaxed, the control will function to cause the stoppage of the motor.

The construction of the control mechanism is such that movement of the hose or tubing in any direction will cause the actuation of the switch mechanism, the connection between the switch actuation lever and the movable hose connection being such as to secure the same operative effect upon the switch mechanism irrespective of the direction or complexity of the movement of the hose connection. When stresses upon the hose or tubing are relieved, all of the parts of the control, including the hose connection, will be automatically restored to their normal positions.

I also provide automatically actuated means whereby accidental actuation of the control mechanism is prevented while the hose or tubing nozzle is engaged with its supporting hook, which means may be utilized for preventing the delivery of gasoline when a pump is not in service.

It is essential not only that the various parts of the control mechanism be so constructed and combined to secure the desired automatic functioning of the mechanism, but to avoid likelihood of breakage or disarrangement of such parts with a resultant loss of control of the pump, or the undesirable continued operation of the motor. Low cost of production and maintenance are also desirable.

The construction and arrangement of the control mechanism of my invention are such as to permit the effective protection of all working parts from the weather, those parts which are necessarily positioned without the main pump casing being so constructed and mounted as not to be affected by weather conditions, dust or dirt.

The invention consists primarily in a gasoline pump including an electric motor and a switch mechanism controlling the circuit to said motor, a control for said switch mechanism embodying a hose connection, a rotatable and rockable support for said connection, a lever operative upon said switch mechanism, a member movably connected with said gyratory support and said lever, and means operative to restore said support, said lever and said member to normal when stresses upon said connection are relieved; and in such other novel features of construction and combination of parts as are hereinafter set forth and described, and more particularly pointed out in the claims hereto appended.

Referring to the drawings,

Fig. 2 is a detail view of the control mechanism upon a larger scale;

Fig. 3 is a section on the line 3—3 of Fig. 2; and

Like numerals refer to like parts throughout the several views.

Figure 1:
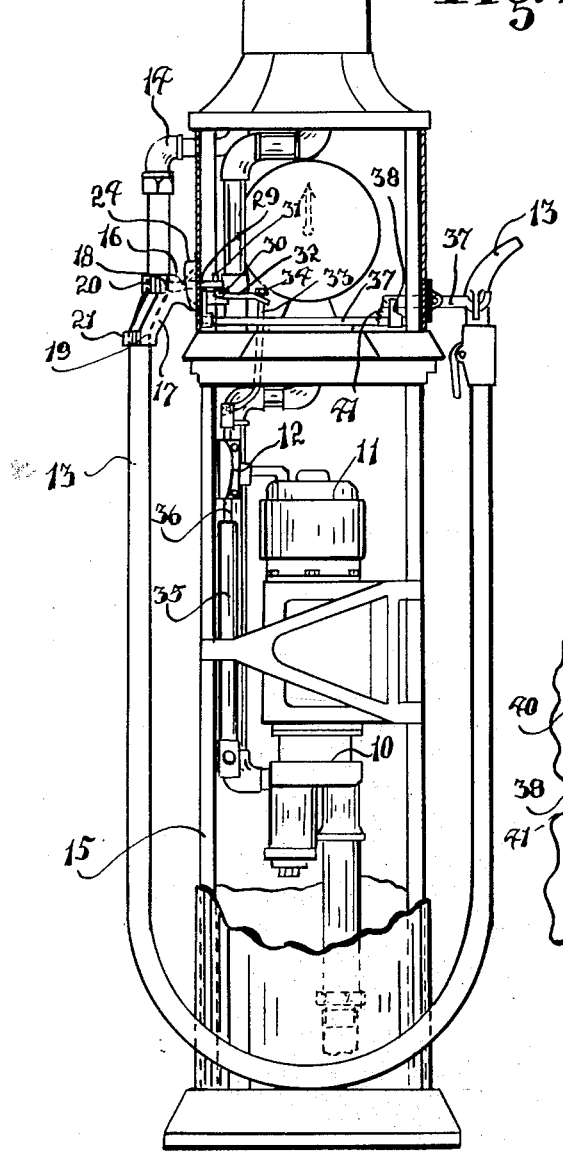
Fig. 1 is an elevation of a gasoline pump embodying the invention, with the main casing removed to disclose the mechanisms housed therein.
Figure 4:
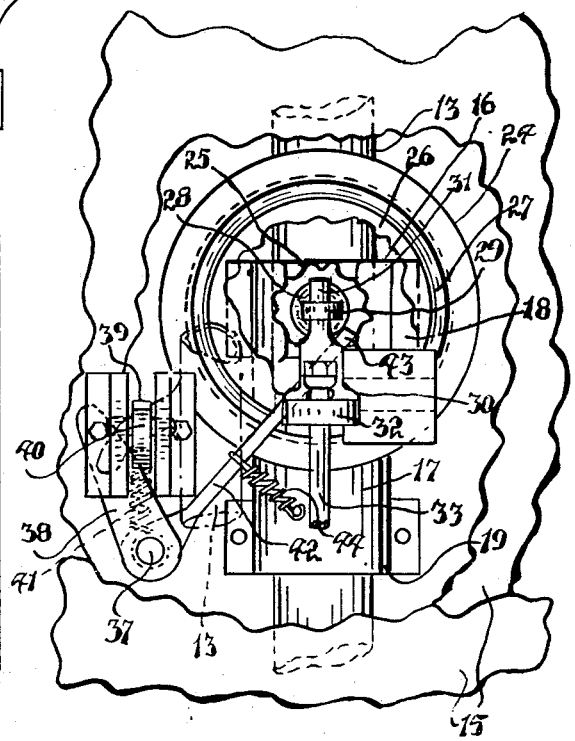
Fig. 4 is a horizontal section of the mechanism shown in Figs. 2 and 3, on the line 4—4 of Fig. 2.

In the embodiment of the invention shown in Fig. 1 of the drawings, the gasoline is withdrawn from a supply tank, not shown, by a rotary pump 10 driven by an electric motor 11, the circuit to which is controlled by a switch mechanism 12. Associated with the rotary pump 10 is a by-pass mechanism for restoring gasoline withdrawn from the supply tank to said tank when the delivery of gas is interrupted by the usual valve mechanism carried by the nozzle of a delivery pipe or tubing 13 connected with the discharge pipe 14 of said rotary pump 10 which extends upwardly and through the main casing 15 so as to have the pipe or tubing hang freely from the upper part of the structure.

The various mechanisms and parts above referred to are old and well known, the invention being directed to a control mechanism actuated by movement of the pipe or tubing 13 and operative upon the switch mechanism 12.

Below the point of connection of the pipe or tubing 13 with the discharge pipe 14, is a rigid connection 16 secured to the pipe or tubing 13 in any desired manner. Preferably, this connection comprises a saddle 17 recessed to receive the pipe or tubing, and having upper and lower flanges 18—19, cooperating with which are stirrups 20—21 embracing the pipe or tubing and firmly clamped thereon by means of screws passing through flanges 22—23 upon said stirrups respectively and engaging the flanges 18—19. The saddle 17 has its lower portion offset from its upper portion and away from the casing 15 so as to bring the pipe or tubing 13 well away from said casing.

Secured to the main casing 15 is a housing 24, open at the front and providing a substantially circular chamber. Mounted in the housing 24 is a gyratory support 25 for the saddle 17, preferably consisting of a hollow conical body 26 integrally connected with the said saddle and having a base of substantially the same diameter as the chamber within the housing 24. The edges of the body 26 are rounded as shown at 27 to ensure a free rolling contact between the body and the wall of the chamber.

By reason of the construction and manner of supporting the body 26 in the housing 24, said body may rotate freely about the axis of said chamber, or about its own axis, may tilt in any direction, or may have a combined tilting and rotating movement. In fact, the support 25 will permit the saddle 17 to assume any position required to enable the pipe or tubing 13 to be brought to a position to properly direct its nozzle so as to ensure the delivery of fluid flowing therethrough at a desired point.

The saddle 17 is pierced to receive the spherical head 28 of a link 29 in a manner to afford a rotatable and rockable connection between the body 26 and said link.

Mounted with the main casing 15 at 30 is a bell crank lever, one arm 31 of which has a loose fit in an opening in the link 29, and the other arm 32 of which is slotted to straddle a stem 33 operative upon the switch mechanism 12 and engage the rounded head 34 of said stem.

Acting upon the arm 32 is means having a normal tendency to so rock the bell crank lever as to actuate the link 29 in a manner to draw the support 25 within the housing 24 until all portions of the edge 27 of the body 26 engage the rear wall of the chamber within said housing. In the drawings, this means is shown as a weight 35 suspended from the switch stem 33 by the connection 36.

With the construction above described, the opening of the switch results from the oscillation of the bell crank lever against the load of the weight 35. To prevent the accidental or unauthorized actuation of said switch mechanism 12, I provide means controlled by the pipe or tubing which will prevent any such movement of the hose connection as will result in the actuation of the switch mechanism 12.

In the embodiment of the invention shown in the drawings, this means comprises a rock shaft 37, carrying a cam shaped crank 38 adjacent a rocking lever 39 provided with a hook 40 from which the nozzle of the pipe or tubing 13 may be suspended when the pump is not in service. Acting upon the lever 39 is a spring 41 normally tending to engage the lever with said crank 38 and rock the shaft 37 to the right, Fig. 3.

Also carried by the shaft 37 is a crank arm 42 having an enlarged head 43 adapted to be interposed between the arm 31 and the main casing 15 in a manner to prevent oscillation of the bell crank lever by the link 29. Acting upon the crank arm 42 is a spring 44 of lower tension than the spring 41. The use of any desired key controlled means preventing movement of the lever 39 will effectively lock the pump.

The operation of the herein described control mechanism is substantially as follows:—

When automobiles pull up to a pump at a service station, the position of any two cars in relation to the pump is seldom the same. The service man is required to fit the nozzle of the pipe or tubing 13 to the filling nozzle of the tank of the automobile, irrespective of the position of the car. When required to fill the tank, the service man merely removes the nozzle of the pipe or tubing 13 from the hook 40. The removal of the weight of the pipe or hosing from this hook permits the spring 41 to rock the lever 39, the movement of this lever in relation to the cam shaped crank 38 turning the shaft 37 in a manner to move the head 43 of the crank arm 42 out of its operative relation to the arm 31 and the main casing 15.

After the service man has inserted the nozzle of the pipe or tubing 13 in the filling nozzle of the automobile tank with his right hand, he merely exerts a pull upon the pipe or tubing with his left hand in the general direction of the car tank from the pump. If a car is close to a pump and the tank of the car is directly opposite the discharge pipe 14, this pull may be almost a directly vertical pull. If the car is more remote from the pump the pull will be radially of the housing 24, and either forwardly or rearwardly of this housing. With a directly vertical pull upon the pipe or tubing 13 the member 26 will have merely a rocking movement about its lower edge, but if there be a lateral pull with a vertical component the member 26 will have both a rotary and a rocking movement or a gyratory action.

The construction of the body 26 is such as to permit the tilting or rocking of said member about a fulcrum point at any part of the periphery of the edge 27. Under some conditions, the rocking may be about the lower vertical radius of the body 26, or this point may vary throughout substantially the entire 360° of the edge 27 of said body 26 according to the position of the car forwardly, rearwardly or laterally of the pump. The rotary movement of the member 26 has no influence upon the link 29, a pull being exerted upon said link merely as a result of the rocking or tilting action of the body 26. This rocking or tilting action will be the same irrespective of the angle at which a pull is exerted upon the connection 16 through the pipe or tubing 13. The manner of connecting the link 29 with the body 26 permits universal movement of the body 26 in relation to said link.

As the body 26 is tilting as a result of pull upon the pipe or tubing 13, longitudinal movement is imparted to the link 29 resulting in the rocking of the bell crank lever 31—32 and the raising of the stem 33 operative upon the switch mechanism 12. This movement of the bell crank lever is opposed by the load of the weight 35 so that it is necessary for the service man to exert a continuous pull upon the pipe or tubing 13 in order to maintain the conditions above described.

The minute the stresses upon the pipe or tubing are relieved, the weight 35 will restore the bell crank lever 31—32, the link 29 and the body 26 to their normal position where they are inoperative to close the switch mechanism 12. In restoring these parts to their normal position, the weight 35 will actuate the switch mechanism 12 to open the circuit to the motor 11 and stop the operation of this motor.

When filling the tank of the automobile, the service man actuates the valve controlling the discharge nozzle of the pipe or tubing 13 in the usual manner. When the correct quantity of gasoline has been delivered to the tank of the automobile, the service man closes the nozzle and drops the pipe or tubing 13, the weight immediately restores the body 26 to its normal position, and this dropping of the pipe or tubing will also permit the weight 35 to function in a manner to immediately stop the pump.

The flexibility of the pipe or tubing 13 permits those movements of the body 26 described above.

The construction of saddle not only spaces the pipe or tubing away from the main pump casing 15, but at the same time permits the application of the stresses resulting from a pull on the hose to the body 26 at an effective leverage.

Since the body 26, link 29, bell crank lever 31—32 and the switch mechanism 12 are instantly restored to their normal inoperative positions when the pipe or tubing 13 is released by the service man, it is obvious that the relation of parts when the pump is not in use will be such that when the nozzle of the pipe or tubing 13 is placed upon the hook 40, the weight of the hose upon said hook will raise the lever 39 against the tension of its springs 41, thus permitting movement of the cam shaped crank 38, the rock shaft 37 and the crank arm 42 by the spring 44 until the enlarged head 43 is interposed in the path of movement of the arm 31 of the bell crank lever so as to prevent the accidental opening of the switch 12 so long as the nozzle is positioned upon the hook.

It will be observed that the operation of the motor 11 is under a remote control through the pipe or tubing 13 irrespective of the position of the service man, and that the service man may instantly interrupt the operation of said motor and of the pump 10 actuated thereby from any position while he is using the pipe or tubing. The main actuating member of the control, the body 26, may be operated from any position about the pump, and will always have the same operative effect irrespective of the point of application of the stresses thereto.

A pump with the control mechanism of my invention may not only be controlled at a point remote therefrom, but the automatic interruption of the power to the motor, without any attention from the operator, avoids all those difficulties resulting from the overrunning of a motor and the development of those high pressures necessary to actuate the by-pass mechanism. Immediately that a proper amount of gasoline has been withdrawn from the main supply tank and delivered to the car tank the service man may leave the pump for the purpose of servicing the car in other respects, or for collecting the charge for the gasoline and making change.

There is no possibility of the service man allowing the pump to operate beyond that period required for the actual delivery of gasoline to the car tank. This permits the operation of the pumps with the minimum consumption of electrical energy as well as eliminates various objectionable features present in such pumps due to the possibility of overrunning of the motor operating the pump.

The stop mechanism actuated by the hook 40 need not be used, but it is highly desirable as providing a safeguard against accidental or malicious opening of the circuit to the motor 11.

While I have described the invention in connection with a gasoline pump, it is obvious that it may also be used in connection with the delivery of other fluids by a motor actuated pump for purposes other than the filling of tanks where a remote control of the operation of the pump is desired. It is not essential that the tilting of the body 26 be at any point within the full 360°, although this is desirable.

The sole attention required of the service man when using a pump equipped with the control mechanism of my invention is to exert a pull upon the pipe or hosing 13 sufficient to actuate the switch mechanism 12 to close the circuit to the motor 11, and to maintain this pull so as to prevent the automatic opening of this switch.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. In a gasoline pump including an electric motor and a switch mechanism controlling the circuit to said motor, a control for said switch mechanism embodying a hose connection, a rotatable and rockable support for said connection, a lever operative upon said switch mechanism, a member movably connected with said rotatable and rockable support and said lever, and means operative to restore said support, said lever and said member to normal when stresses upon said connection are relieved.

2. In a gasoline pump including an electric motor and a switch mechanism controlling the circuit to said motor, a control for said switch mechanism embodying a hose connection, a rotatable and rockable support for said connection, a lever operative upon said switch mechanism, a member movably connected with said rotatable and rockable support and said lever, means operative to restore said support, said lever and said member to normal when stresses upon said connection are relieved, a rocking lever having a hook adapted to support a hose, means normally preventing movement of said lever operative upon said switch mechanism, and an actuating member for said last named means controlled by said hook lever.

3. In a gasoline pump including an electric motor and a switch mechanism controlling the circuit to said motor, a control for said switch mechanism embodying a hose connection, a housing open at the front and forming a substantially circular chamber, a hollow conical body supporting said hose connection and having a base of substantially the same diameter as the chamber within said housing, a lever operative upon said switch mechanism, a member movably connected with said body and said lever, and means operative to restore said body, said lever and said member to normal when stresses upon said connection are relieved.

4. In a gasoline pump including an electric motor and a switch mechanism controlling the circuit to said motor, a control for said switch mechanism embodying a hose connection, a housing open at the front and forming a substantially circular chamber, a hollow conical body supporting said hose connection and having a base of substantially the same diameter as the chamber within said housing, a bell crank lever, one arm of which is operative upon said switch mechanism, a link, one end of which has a loose connection with the other arm of said bell crank lever, and the other end of which is connected with said body in a manner to permit a rotary or rocking movement of said body within its housing, and means operative to restore said support, said bell crank lever and said link to normal when stresses upon said connection are relieved.

5. In a gasoline pump including an electric motor and a switch mechanism controlling the circuit to said motor, a control for said switch mechanism embodying a hose connection, a housing open at the front and forming a substantially circular chamber, a hollow conical body supporting said hose connection and having a base of substantially the same diameter as the chamber within said housing, a bell crank lever, one arm of which is operative upon said switch mechanism, a link, one end of which has a loose connection with the other arm of said bell crank lever, said body having an opening therethrough, and said link, at the other end thereof, having a spherical portion engaging the walls of said opening, whereby said body may have a rotary and a tilting movement within said housing, and means operative to restore said support, said bell crank lever and said link to normal when stresses upon said connection are relieved.

6. In a gasoline pump including an electric motor and a switch mechanism controlling the circuit to said motor, a control for said switch mechanism embodying a hose connection, a housing open at the front and forming a substantially circular chamber, a hollow conical body supporting said hose connection and having a base of substantially the same diameter as the chamber within said housing, a bell crank lever, one arm of which is operative upon said switch mechanism, a link, one end of which has a loose connection with the other arm of said bell crank lever, and the other end of which is connected with said body in a manner to permit a rotary or rocking movement of said body within its housing, means operative to restore said support, said bell crank lever and said link to normal when stresses upon said connection are relieved, a rocking lever having a hook adapted to support a hose, means normally preventing movement of said lever operative upon said switch mechanism, and an actuating member for said last named means controlled by said hook lever.

7. In a gasoline pump including an electric motor and a switch mechanism controlling the circuit to said motor, a control for said switch mechanism embodying a hose connection, a housing open at the front and forming a substantially circular chamber, a hollow conical body supporting said hose connection and having a base of substantially the same diameter as the chamber within said housing, a bell crank lever, one arm of which is operative upon said switch mechanism, a link, one end of which has a loose connection with the other arm of said bell crank lever, and the other end of which is connected with said body in a manner to permit a rotary or rocking movement of said body within its housing, means operative to restore said support, said bell crank lever and said link to normal when stresses upon said connection are relieved, a rocking lever having a hook adapted to support a hose, a rock shaft mounted adjacent said lever, a crank arm carried by said shaft having a portion adapted to be interposed in the path of, and prevent movement of, said bell crank lever, a cam shaped crank arm carried by said rock shaft in operative relation to said rocking lever, a spring tending to normally engage said rocking lever with said cam shaped crank, and a second spring tending normally to interpose said first named crank arm in the path of movement of said bell crank lever.

8. In a gasoline pump including an electric motor and a switch mechanism controlling the circuit to said motor, a control for said switch mechanism embodying a saddle adapted to receive a hose having its lower portion offset in relation to its upper portion, stirrups co-operating with said saddle, means clamping said stirrups upon said hose, a rotatable and rockable support for said saddle, a lever operative upon said switch mechanism, a member movably connected with said rotatable and rockable support and said lever, and means operative to restore said support, said lever and said member to normal when stresses upon said saddle are relieved.

9. In a gasoline pump including an electric motor and a switch mechanism controlling the circuit to said motor, a control for said switch mechanism embodying a saddle adapted to receive a hose having its lower portion offset in relation to its upper portion, stirrups co-operating with said saddle, means clamping said stirrups upon said hose, a housing open at the front and forming a substantially circular chamber, a hollow conical body supporting said saddle and having a base of substantially the same diameter as the chamber within said housing, a bell crank lever, one arm of which is operative upon said switch mechanism, a link, one end of which has a loose connection with the other arm of said bell crank lever, and the other end of which is connected with said body in a manner to permit a rotary or rocking movement of said body within its housing, means operative to restore said support, said bell crank lever and said link to normal when stresses upon said saddle are relieved, a rocking lever having a hook adapted to support a hose, a rock shaft mounted adjacent said lever, a crank arm carried by said shaft having a portion adapted to be interposed in the path of, and prevent movement of, said bell crank lever, a cam shaped crank arm carried by said rock shaft in operative relation to said rocking lever, a spring tending to normally engage said rocking lever with said cam shaped crank, and a second spring tending normally to interpose said first named crank arm in the path of movement of said bell crank lever.

In witness whereof I have hereunto affixed my signature, this 21st day of October, 1930.

ALFRED H. ZOLLER.